United States Patent
Noldus et al.

(10) Patent No.: US 7,778,646 B2
(45) Date of Patent: Aug. 17, 2010

(54) METHOD AND SYSTEM FOR INCLUDING LOCATION INFORMATION IN A USSD MESSAGE BY A NETWORK NODE

(75) Inventors: Rogier Noldus, Goirle (NL); Jo van de Kruijs, Rijen (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 642 days.

(21) Appl. No.: 10/595,075

(22) PCT Filed: Jul. 29, 2004

(86) PCT No.: PCT/EP2004/008557
§ 371 (c)(1),
(2), (4) Date: Jan. 30, 2006

(87) PCT Pub. No.: WO2005/015926
PCT Pub. Date: Feb. 17, 2005

(65) Prior Publication Data
US 2006/0229084 A1    Oct. 12, 2006

(51) Int. Cl.
*H04W 24/00* (2009.01)
(52) U.S. Cl. .............. 455/456.1; 455/456.2; 455/456.3; 455/404.2; 455/406
(58) Field of Classification Search .............. 455/456.1, 455/456.2, 456.3, 404.2, 406
See application file for complete search history.

(56) References Cited

U.S. PATENT DOCUMENTS

| | | | | |
|---|---|---|---|---|
| 5,930,699 A | * | 7/1999 | Bhatia | 455/456.3 |
| 6,427,076 B2 | * | 7/2002 | Skog | 455/433 |
| 6,539,217 B1 | * | 3/2003 | Syed et al. | 455/406 |
| 2004/0248546 A1 | * | 12/2004 | Bhaumick | 455/404.2 |
| 2005/0009499 A1 | * | 1/2005 | Koster | 455/406 |
| 2008/0095339 A1 | * | 4/2008 | Elliott et al. | 379/93.01 |

FOREIGN PATENT DOCUMENTS

| | | |
|---|---|---|
| EP | 1 389 881 A | 2/2004 |
| WO | WO 98/21913 A | 5/1998 |
| WO | WO 98/27782 A | 6/1998 |
| WO | WO 99/43144 A | 8/1999 |
| WO | WO 00/56091 A | 9/2000 |
| WO | WO 00/79811 A | 12/2000 |

* cited by examiner

*Primary Examiner*—Barry W Taylor

(57) ABSTRACT

The present invention relates to a method of providing a location specific service in a digital cellular communication network using unstructured supplementary service data. In the method, the service data is sent to a network node of said network by at least one mobile station, and the service is dependent of location information of said at least one mobile station. Said method comprises a step of including location information in said service data by said network node. The invention is further related to a network node for use with a method as described here.

16 Claims, 3 Drawing Sheets

METHOD AND SYSTEM FOR INCLUDING LOCATION INFORMATION IN A USSD MESSAGE BY A NETWORK NODE

FIELD OF THE INVENTION

The present invention relates generally to a method of providing a location specific service in a digital cellular communication network using unstructured supplementary service data and more specifically to a method of providing a location specific service in a digital cellular communication network using unstructured supplementary service data, wherein said service data is sent to a network node of said network by at least one mobile station.

The present invention further relates to a network node for a telecommunications network comprising an input unit for receiving unstructured supplementary service data from at least one mobile station, and a processing unit for processing said service data.

BACKGROUND OF THE INVENTION

An operator of a mobile telecommunication network such as a Global System for Mobile communication (GSM) or a Universal Mobile Telecommunication System (UMTS) uses USSD which stands for Unstructured Supplementary Service Data (hereinafter referred to as Service Data) for a variety of services, often related to pre-paid. Examples of these services are credit replenishment, credit inquiry and call information inquiry.

Service Data may also be used in combination with other services, such as a Virtual Private Network (VPN). Service Data may be used as mechanism to trigger stand-alone services, such as location request, weather report, and traffic report. One of the advantages of sending an service request using Service Data is that it is generally faster than sending a short message service message (SMS).

Service Data services are offered by a Service Data handler (hereinafter referred to as USSD Handler), which is the service logic that provides the service to the user. The USSD Handler may be located in the Home Location Register (HLR) or external to the HLR, e.g. in a service control point (SCP).

The communication between the HLR and the external Service Data Service may run via a Service Data signalling gateway. Operators may have a need to charge the user for the use of particular Service Data services. In addition, some operators require that the charge of the use of Service Data services is based on the location of the subscriber. Location based charging for Service Data services may also be a regulatory requirement in certain countries.

Operators may also need to apply differentiated tariff schemes on the use of Service Data services, based on the time of day the subscriber is using these services.

For example during off-peak hours, the tariff may be lower than during peak hours, when the load on the Network is at its highest. Considering that in one country or serviced area of a network different time-zones may occur, an operator may need to know at what local time of day (hereinafter called "Local Time") the subscriber is using the service.

Besides charging of Service Data services, an operator or service provider may need to provide services to a subscriber, based on the location of the subscriber. These kind of services comprise stand-alone services as mentioned before, such as location request, weather report, traffic report, and other services that are typically location dependent or location oriented.

Determining subscriber's geographical location, according to the state of the art, takes place in the following way.

When the subscriber initiates a Service Data session, the HLR has the visitor location register (VLR) address available; the VLR address gives an indication of the location of the subscriber. The VLR address may be used to adapt the charge towards the subscriber for the Service Data service. For some operators, however, the VLR address is not accurate enough for this purpose. Especially when the VLR service area spans a large geographical area. Instead of the VLR address, the operator may need to know the current cell identifier (Cell ID) or location area. In addition, for charging reasons, the location of a subscriber is often defined by the location number.

A location number is derived from the Cell ID where the subscriber is located. Location number, Cell ID and location area may be known in VLR, but not in the HLR. Hence, a USSD Handler (residing in HLR or external to HLR) does not have access to that information at the time that the Service Data Service is invoked. Location based charging of the Service Data service is therefore not possible.

In some solutions of the prior art, location information indicating means in a mobile station (MS) are adapted to identify a cell identifier for a cell within the digital cellular communication network where the mobile station is roaming and also to output the cell identifier via the unstructured supplementary service data interface means. However, this solution has a number of disadvantages.

Firstly this is a complex solution, requiring special and dedicated location information Service Data messages, which also increases traffic. It also requires additional complexity in the Mobile Station. The current prior art solutions describe a method whereby a mobile station uses a dedicated mechanism to send Location Information via a Service Data message to a service.

Secondly, a Mobile Services Switching Centre (MSC) may service a wide area consisting of cells that cover possibly more than one time zone. There is a need for a reliable solution for determining the use of a service or the Service Data service itself, by the subscriber at a particular local time of day. The current solutions only provide the time of receiving of a request, being the local time of a MSC receiving the request, to be forwarded by a dedicated Service Data message.

SUMMARY OF THE INVENTION

It is an object of the present invention to deal with the aforementioned disadvantages of the prior art and provide a less complex method and system for transmitting Location Information using Service Data.

These and other objects are achieved by the present invention in that there is provided a method of providing a location specific service in a digital cellular communication network using unstructured supplementary service data, wherein said service data is sent to a network node of said network by at least one mobile station, said service being dependent of location information of said at least one mobile station, wherein said method comprises a step of including location information in said service data by said network node.

It will be appreciated that the location information can be included in the Service Data message by the network node without having to send additional dedicated Service Data messages. In addition, since the location information is included by the network node, no means for establishing the location information are required by the mobile station, where Service Data messages are assembled.

The invention is based on the insight that the network node receiving the Service Data messages from the mobile station is aware of the location of the mobile station, since the mobile station must be located somewhere in the cell which is covered by the network node. It therefore only has to intercept the incoming Service Data message, include the location information, and perform the required actions as usual (e.g. forward the message).

According to an embodiment of the present invention, said network node forwards said service data to a storage unit. Such a storage unit may, for example and in accordance with another embodiment, comprise a Home Location Register. The Home Location Register will then be aware of the location of the mobile station as soon as the information is required by the Home Location Register.

According to another embodiment, said storage unit is associated with an external service node. It will be appreciated that the advantages of this embodiment is that the external service node may access the location information in the storage unit, or alternatively, it may be forwarded by the storage unit. Another option is that the service node will provide details regarding the availability of the location information in the storage unit, to any other node, server or entity involved in the service provisioning.

According to another embodiment of the present invention, said network node further includes a Reference Number in said service data. The advantage of this is that the Service Data are uniquely identifiable by the Reference Number.

In yet another embodiment, said reference number is used to correlate a service data call detail record of said service data forwarded by said network node, with a service call detail record of said service provided. In this way the Call Detail Records (CDRs) may unambiguously be identified to belong to a specific Service Data request and the subsequent Service Data service.

According to another embodiment, said location information is used for location-dependent charging. It will be appreciated that the costs of providing the service may differ based on the location information of the mobile station and on which units and nodes are required to provide the service at that location. With this embodiment charging may be differentiated based on the location of the mobile station at the time of a Service Data request.

According to another embodiment, said location information is used for time-dependent charging. For similar reasons as above, it may be required or desired to differentiate charging based on the time of day on which the mobile station sends a Service Data request. This is made possible with the embodiment described here.

According to another embodiment, said storage unit keeps a register of location identifiers, such as cell identifiers or service area identifiers, mapped on geographical time zone data, and a correction factor applicable for any cell that resides in a time zone different from the time zone of said network node. Using this embodiment, the services may be provided serving mobile stations location and time independent, while a fair and simple charging scheme may be applied.

According to another embodiment of the present invention, said network node is a mobile services switching centre.

According to a second aspect of the present invention there is provided a network node for a telecommunications network comprising: an input unit for receiving unstructured supplementary service data from at least one mobile station; a processing unit for processing said service data; and means for maintaining location information of said at least one mobile station, wherein said processing unit is arranged for including said location information of said at least one mobile station in said service data.

Said network node may, according to an embodiment thereof, further comprise means for generating a reference number associated with said service data, wherein said processing unit is arranged for including said reference number in said service data.

According to another embodiment, said network node further comprises an output unit for forwarding said service data to a storage unit. Said storage unit may, for example and according to another embodiment, comprise a Home Location Register.

According to yet another embodiment of the network node of the present invention, said storage unit is associated with an external service node.

The principle proposed in the present invention is equally applicable to GSM 2G networks, such as GSM R98, and 3GPP 3G networks, such as 3GPP R99 and others. The Location Information in the Service Data reflects the type of access network, depending on the parameters present in Location Information.

BRIEF DESCRIPTION OF THE DRAWINGS

In the following section, the invention will be described by way of examples of its embodiments with reference to the attached drawing, wherein.

DETAILED DESCRIPTION OF THE EMBODIMENTS

The innovative teachings of the present invention will be described with particular reference to the presently preferred exemplary embodiments. However, it should be understood that this class of embodiments provides only a few examples of the many uses of the innovative teachings herein. In general, statements made in the specification of the present invention do not necessarily delimit any of the claimed invention.

Figure 1:
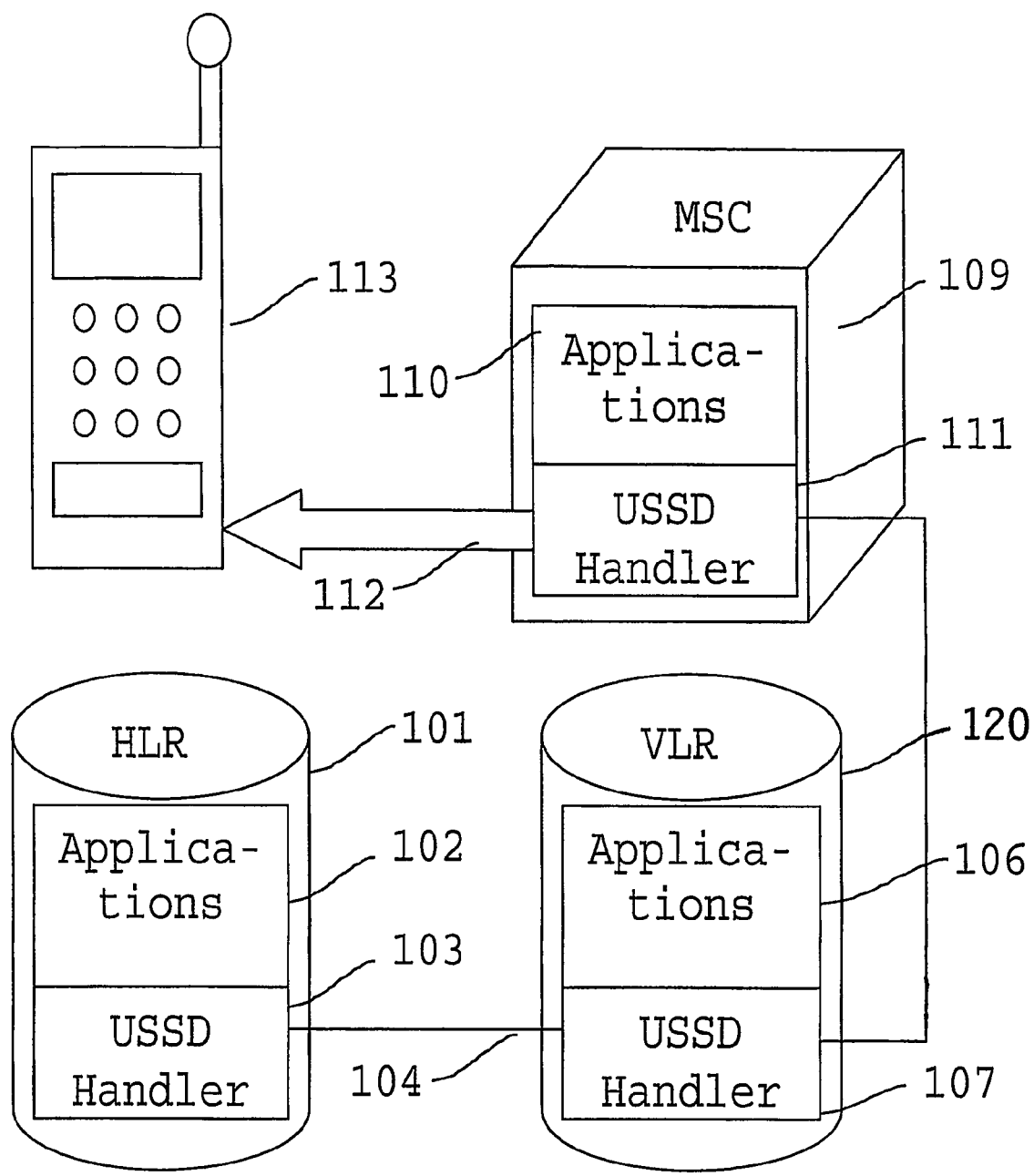
FIG. 1 shows the handling of a Service Data request of a mobile subscriber, according to the state of the art.

With reference to FIG. 1 of the drawings, the handling of network initiated Service Data-dialogues in general according to the state of the art is shown. When an application 102 in the HLR 101 is to send through a USSD Handler 103 a Service Data request or notification to a Mobile Station 113 it sets up a dialogue 104 to the Visitor Location Register VLR 105 where the Mobile Station 113 is currently registered and sends the operation to the VLR 105 from where it is relayed to the Mobile Station 113. It then waits for a response. The HLR 101 is responsible for controlling the dialogue 104 and shall therefore release the dialogue when it receives a response from the VLR 105.

Another case relates to an application 106 where the VLR 105 sends a Service Data request or notification by means of USSD handler 107 to a mobile station 113 and sets up a dialogue 108 through USSD Handler 111 of the MSC 109 where the Mobile Station 113 is currently registered. Here, VLR 105 sends the operation to the MSC 109 and then awaits a response. The VLR 105 is responsible for controlling the application 106 and therefore normally releases the application 106 when it receives a response from the MSC 109. As in the above-mentioned case, also with a dialogue 108 invoked by the VLR 105 the dialogue 108 is forwarded by the MSC 109.

The third case relates to an application 110 where an MSC 109 sends a Service Data request or notification 112 by means of UDSSD Handler 111 to a Mobile Station 113. If the Mobile Station 113 releases the transaction at any time, e.g., due to a clearing, the MSC 109 terminates the Service Data-dialogue 112.

Figure 2A:
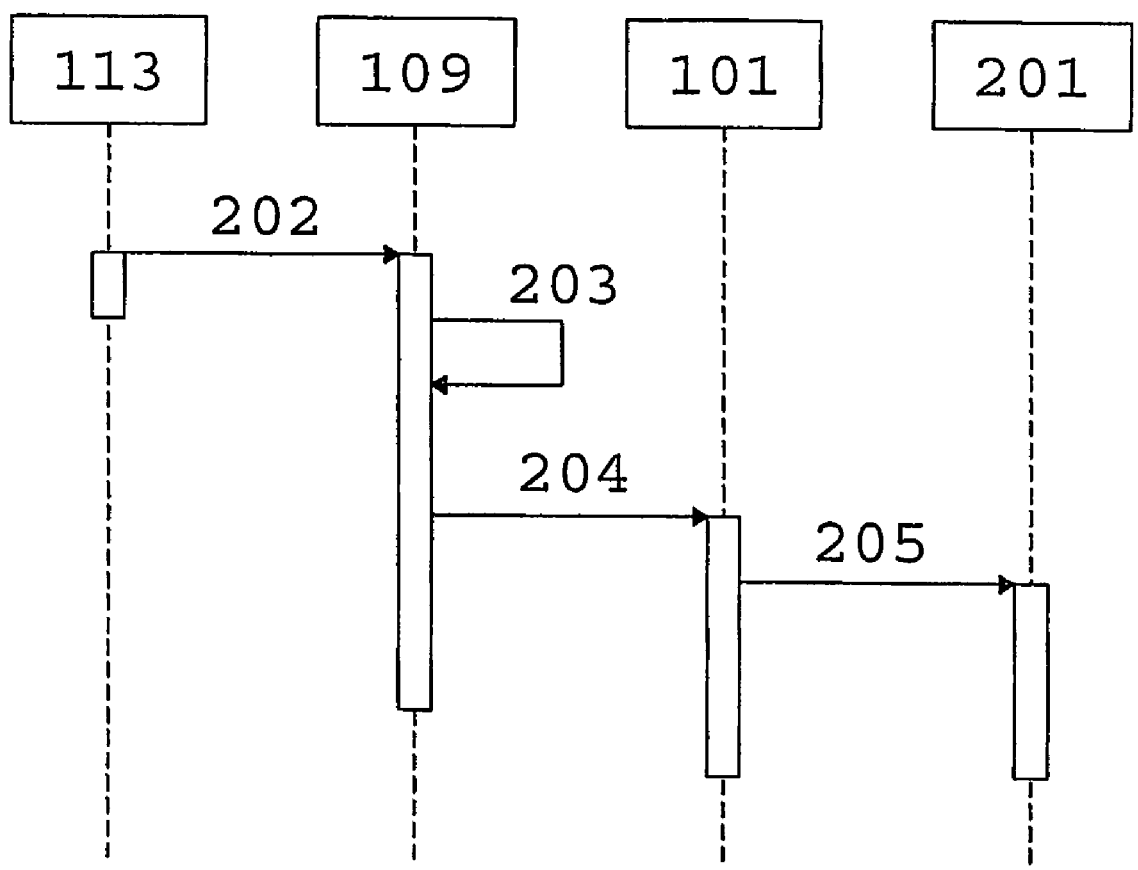
FIG. 2a shows a general message sequence of the present invention.

With reference to FIG. 2a of the drawings, a general message sequence diagram is shown of the present invention.

A Mobile Station 113 sends a Service Data request 202 to a network node 109 which may be an MSC as in a GSM network. The network node 109 adds in step 203 Location Information to the Service Data. The Location Information and a Service Data reference number (hereinafter referred to as Reference Number) are included in the MAP message 204 to the HLR 101. The HLR 101 sends a MAP message 205, which includes the Location Information and Reference Number, to a service node (Service Node) 201. Network node 109 sends the Service Data including the Location Information to the HLR 101. The HLR 101 sends the Service Data including the Location Information to the Service Node 201.

Figure 2B:
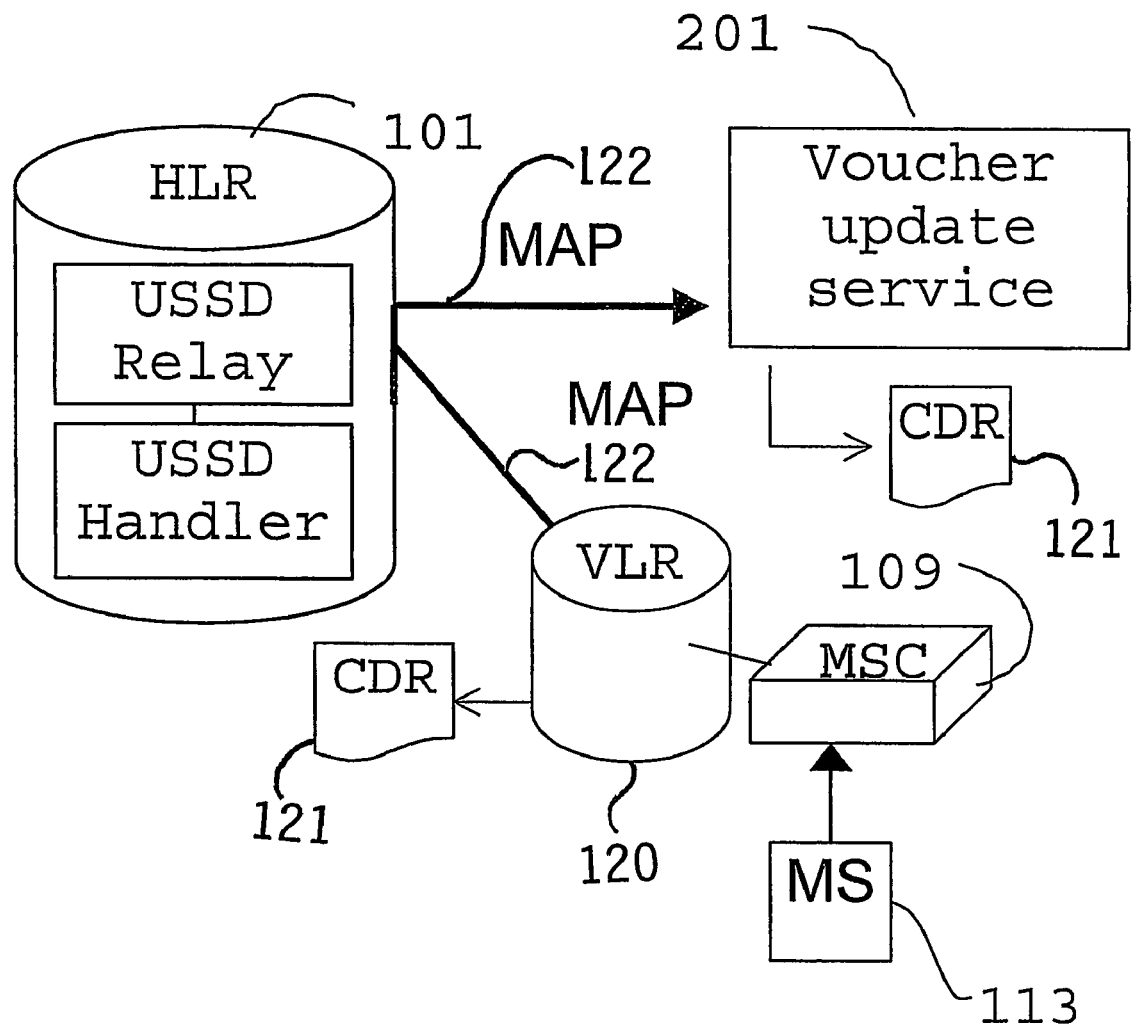
FIG. 2b shows a first embodiment of the proposed solution with Transport of Location Information to a Service Data service for charging purposes.

With reference to FIG. 2b of the drawings, a graphical overview of Service Data information flow in the mobile network is shown, wherein MAP is the Mobile Application Part and MS is the mobile station 113 of a subscriber. In the example the Mobile Station is roaming and the MSC is a type of network node 109 transmitting the Service Data request to a Visitor Location Register (VLR), which in this case performs the act of adding location information and a Reference Number to the MAP message, which is sent to the HLR 101. VLR and MSC are shown as allied devices because in practice the VLR usually resides at the location of the MSC. The Service Node 201 using the Location Information that is transmitted by the Service Data Relay of the HLR 101, in this case uses the Location Information for a voucher update service. An updated call detail record (CDR) is produced by the voucher service for charging purposes.

It is recognized by those skilled in the art that within the spirit of the invention, by appropriate changing of some parameters, the other embodiments may be realized. Location information, for example, could also comprise Local Time information as required for realizing the third and fourth embodiment.

Next the transport of Location Information is described in more detail. It will be appreciated that details regarding the MAP Messages used for Service Data are known to the person skilled in the art.

Improved accuracy, regarding the subscriber Location Information, may be obtained by including the Location Information in the Service Data request. When the Service Data request is sent from serving MSC to HLR, there has just been radio contact with the subscriber, so the Location Information in the VLR is up-to-date. The availability of Location Information allows the Service Data service to vary the service charge accordingly.

The Service Data flow between VLR and HLR uses MAP Messages. The MAP Messages used for Service Data purposes contain a protocol enhancement mechanism. Location Information may be included in the MAP Message between VLR and HLR, without requiring the implementation of an updated MAP protocol.

The Location Information that is included in the MAP Message used for initiating the Service Data Flow, may be an identical copy of the information that is contained in the VLR for the served subscriber. That means that the VLR need not apply any processing in order to obtain the Location Information. The Location Information may be read from the VLR's internal register, in the same way as it is e.g. done for the MAP Message Provide Subscriber Info result.

The Location Information may include information fields such as:
  Cell Id (2G access node);
  Service Area Id (3G access node);
  Location Number;
  Geographical Information;
  Location Area Id.

The structure of the Location Information data element is in line with the structure already used in prior art, and is known to the person skilled in the art.

The Location Information is included in the Service Data from MSC to HLR and in the Service Data from HLR to external Service Data Service. For external Service Data services, the HLR functions as a Service Data Relay. The HLR copies the Location Information from the incoming Service Data request on to the forwarded Service Data request, as it currently does for the other Service Data requests.

The encoding of the Location Information in the Service Data shall follow the encoding which is known to the person skilled in the art for other MAP Messages that carry the Location Information.

Especially in conjunction with on-line charging, it is a common requirement that CDRs in the Core Network comprising network nodes such as Mobile Services Switching Centre (MSC), Serving GPRS Support Node (SGSN) and Gateway MSC (GMSC), can be correlated with the CDRs produced by the on-line charging system. Therefore, it shall be possible to correlate the Service Data CDR produced in the MSC with a Service Data CDR produced in the HLR or by an external Service Data Service.

This may be accomplished by placing a Reference Number in the Service Data request from MSC to HLR. This Reference Number shall be placed in both the MSC-based Service Data CDR and in an HLR-based Service Data CDR (service specific CDR). In addition to the Reference Number, the MSC Address shall be placed in the respective CDRS. The combination of Reference Number and MSC Address forms a globally unique pair.

The CDR produced in the MSC or HLR is the "SS-action record"; The MSC or HLR shall add the Reference Number to the SS-action record. The SS-action record contains already the Recording Entity, which is the MSC Address or HLR Address.

Please refer to table 1 below; according to the present invention the Reference Number may be included in the SS-action record.

TABLE 1

| Field | 2G | 3G | Description |
| --- | --- | --- | --- |
| Record Type | M | M | Supplementary service action. |
| Served IMSI | M | M | The IMSI of the MS performing the action. |
| Served IMEI | $O_c$ | $O_c$ | The IMEI of the ME performing the action. |
| Served MSISDN | $O_m$ | $O_m$ | The primary MSISDN of the party performing the action. |
| MS Classmark | M | M | The mobile station classmark. |
| Recording Entity | M | M | The E.164 number of the visited MSC/HLR. |
| Location | $O_m$ | $O_m$ | The identity of the cell or the SAC, including the location area code, from which the request originated. |

TABLE 1-continued

| Field | 2G | 3G | Description |
|---|---|---|---|
| System Type | — | M | This field is present when either the UTRAN or GERAN air-interface is used. It is omitted when the service is provided by a GSM air interface. |
| USSD Reference Number | O | O | The USSD Reference Number is generated by the serving MSC. It may be used to distinguish individual USSD actions at the serving MSC. |

The Location Information, Reference Number and MSC Address are included in the Service Data request. The inclusion of these elements is done only for Service Data requests, from MSC to HLR, for subscribers who belong to that network. That means that the inclusion is done when the International Mobile Subscriber Identifier (IMSI) of the served subscriber (i.e. the subscriber who requests the Service Data Service) belongs to the same network.

Not all parameters present in the MAP definition of LocationInformation need to be included in the Service Data MAP Message. As an implementation option, the MSC may include the Location Number only, in the case that the Location Number is sufficient for the USSD Handler to adapt the on-line charge.

Table 2 below shows the syntax of the CDR produced in the MSC or HLR for a Service Data service request. According to the present invention a Reference Number (in table 2 referred to as USSDReferenceNumber) is added to the CDR definition.

TABLE 2

```
USSD-Arg ::= SEQUENCE {
ussd-DataCodingScheme   USSD-DataCodingScheme,
ussd-String             USSD-String,
... ,
alertingPattern         AlertingPattern          OPTIONAL,
msisdn                  [0]ISDN-AddressString    OPTIONAL,
locationInformation     [1]LocationInformation   OPTIONAL,
ussdReferenceNumber     [2]CallReferenceNumber   OPTIONAL,
mscAddress              [3]ISDN-AddressString    OPTIONAL
}
LocationInformation ::= SEQUENCE {
AgeOfLocationInformation  AgeOfLocationInformation  OPTIONAL,
geographicalInformation   [0]GeographicalInformation OPTIONAL,
vlr-number                [1]ISDN-AddressString     OPTIONAL,
locationNumber            [2]LocationNumber         OPTIONAL,
cellIdOrLAI               [3]CellIdOrLAI            OPTIONAL,
extensionContainer        [4]ExtensionContainer     OPTIONAL,
...}
CallReferenceNumber ::= OCTET STRING (SIZE (1..8))
```

Although preferred embodiments of the system, method, and apparatus of the present invention have been illustrated in the accompanying Drawings and described in the foregoing Detailed Description, it is recognized by those skilled in the art, that the invention is not limited to the embodiments disclosed, but is capable of numerous rearrangements, modifications, and substitutions without departing from the spirit of the invention.

The invention claimed is:

1. A method of providing a location specific service in a digital cellular communication network using unstructured supplementary service data, wherein said unstructured supplementary service data is sent to a network node of said network by at least one mobile station, said unstructured supplementary service data being dependent of location information of said at least one mobile station, wherein said method comprises a step of
   including location information in said service data by said network node.

2. The method according to claim 1, wherein said network node is a Mobile Services Switching Center (MSC) and forwards said unstructured supplementary service data, including the location information, to a storage unit.

3. The method according to claim 2, wherein said storage unit is a Home Location Register.

4. The method according to claim 2, wherein said storage unit is associated with an external service node.

5. The method according to claim 1, wherein said network node further includes a Reference Number in said service data.

6. The method according to claim 5, wherein the Reference Number is used to correlate a service data call detail record of said unstructured supplementary service data forwarded by said network node, with a service call detail record of said service provided.

7. The method according to claim 1, wherein said location information is used for location-dependent charging.

8. The method according to claim 1, wherein said location information is used for time-dependent charging.

9. The method according to claim 8, wherein said storage unit keeps a register of location identifiers, such as cell identifiers or service area identifiers, mapped on geographical time zone data, and a correction factor applicable for any cell that resides in a time zone different from the time zone of said network node.

10. The method according to claim 1, wherein said network node is a mobile services switching centre.

11. A network node for a telecommunications network comprising an input unit for receiving unstructured supplementary service data from at least one mobile station, comprising
   a processing unit for processing said unstructured supplementary service data, and
   means for maintaining location information of said at least one mobile station, wherein said processing unit is arranged for including said location information of said at least one mobile station in said unstructured supplementary service data.

12. The network node according to claim 11, wherein said network node further comprises means for generating a reference number associated with said service data, wherein said processing unit is arranged for including said reference number in said service data.

13. The network node according to claim 11, wherein said network node is a Mobile Services Switching Center, (MSC) and comprises an output unit for forwarding said service data to a storage unit.

14. The network node according to claim 13, wherein said storage unit is a Home Location Register.

15. The network node according to claim 13, wherein said storage unit is associated with an external service node.

16. The network node according to claim 11, wherein said network node is a mobile services switching centre.

* * * * *

UNITED STATES PATENT AND TRADEMARK OFFICE
CERTIFICATE OF CORRECTION

PATENT NO. : 7,778,646 B2  Page 1 of 1
APPLICATION NO. : 10/595075
DATED : August 17, 2010
INVENTOR(S) : Noldus et al.

It is certified that error appears in the above-identified patent and that said Letters Patent is hereby corrected as shown below:

In Column 5, Line 6, delete "UDSSD" and insert -- USSD --, therefor.

In Column 6, Line 40, delete "CDRS." and insert -- CDRs. --, therefor.

Signed and Sealed this
First Day of February, 2011

David J. Kappos
*Director of the United States Patent and Trademark Office*